UNITED STATES PATENT OFFICE.

WILLIAM H. ALTON, OF NEW YORK, N. Y.

ART OF TREATING CALCIUM CARBONATE.

1,379,157.  Specification of Letters Patent.  Patented May 24, 1921.

No Drawing.  Application filed May 8, 1920. Serial No. 379,823.

*To all whom it may concern:*

Be it known that I, WILLIAM H. ALTON, a citizen of the United States, residing at New York city, borough of Manhattan, county and State of New York, have invented a certain new and useful Art of Treating Calcium Carbonate, of which the following is a specification.

This invention relates to the art of treating calcium carbonates, and the manufacture of products known commercially under the names of "Whiting", "Spanish white" and "Paris white".

Heretofore, the material from which these products have been produced has, in the main, been imported in the form of chalk from Norway, France and England, and, it has been more especially quarried from the high cliffs near Dover, England. It is generally believed that these cliffs were formed centuries ago by the shells of myriads of sea animalculæ which died in such numbers as to form shoals in the bed of the ocean, which were at a subsequent date heaved up by some convulsion of nature. These microscopic shells are high in calcium carbonate and, having long ago lost all regular form through decomposition are now in amorphous or irregular particles with fine, feather edges similar to snow flakes. Chalk of this character appears to be composed of rather sharp and gritty particles and other particles which are very soft and feathery in texture.

The chalk thus dug or quarried is imported after which it is ground up with water into the consistency of cream and allowed to flow by gravity from the mill through a series of settling tanks or vats, in which vats the various grades are separated out. That is to say, in the first vat, the coarse and heavier particles settle out with the sand, etc., and are classified as commercial whiting, the second and subsequent vats contain the settlings generally classified as gilders, extra gilders, Paris white, etc. The water is drained off from time to time and the whiting is dug out in the form of cream colored mud, which is dried out and subsequently ground into powder, which is packaged in bags or barrels ready for use.

Whiting in its different grades is used in the manufacture of paints, putty, calcimine, rubber, linoleums, porcelain, and glassware, and in many other branches in industry. Certain whiting substitutes have recently been developed, and have attained a certain measure of success for restricted uses, but as they are more or less of a crystalline nature, the grains are round like microscopic cobble stones and lack the cohesive, or interlaced, and bonded effect brought about by contact of the feather, or snow flake edges of the whiting made from English chalk and referred to technically as "stretch", and which is due to the amorphosity of the grains which, in turn, give the plasticity and tensile strength so necessary a quality in putty, calcimine and rubber, and which is the unique characteristic of English whiting; all substitutes having been found inferior, or impracticable in the making of putty, (essential to shipbuilding) calcimine and the most necessary grades of rubber.

The object of the present invention is to provide a method or process whereby whiting possessing all the desirable qualities of the English whiting may be produced from the natural resources of our country, either through operating directly upon limestone or any other suitable calcium carbonate, such as shells, etc., or by operating upon the waste of lime kilns.

In the preferred manner of carrying out my invention, I take a high calcium limestone, and reduce it by mechanical crushing to a size that will pass through an iron ring of one and one-half inches in diameter. I then subject it, by means of a rotary or fixed kiln or electric furnace, to a sudden heat of 1,000 degrees Fahrenheit, more or less, as found to be required by different types of stone, in order to bring about a complete splintering or fracturing of the crystals into amorphous or irregular shapes, and which bursting or exploding effect produces the quality of amorphosity not heretofore attained by any practical and commercial means of mechanical grinding. After this splintering or fracturing effect has changed the particles from a crystalline to an amorphous structure, I leave them subjected to a continuation of such degree of heat, and for such a required length of time as will partially "burn" these particles into quick lime thus changing the character of their exterior from calcium carbonate into calcium oxid, but extracting them within such time as to leave a microscopic core or heart of calcium carbonate remaining within each little grain of the oxid, but which shall have become friable with the heat, and softer than in its natural condition. I do not limit or restrict myself to any exact percentage of the grains which shall be underburnt at the core. I also do not limit or restrict myself to just the above method of preparation, but utilize within the broad scope of my invention any semiwaste lime which can be had from all types of kilns, such as "forkings", "lime dust", "cores", "agricultural lime" and the fine dust caught in all types of dust collectors and the underburnt lime of every description which is usually disposed of almost in the character of a waste, because not coming up to the specifications of standard calcium oxid owing to its greater or lesser percentage of unburnt calcium carbonate, and which many times is thrown away as an absolute waste, and many other times becomes a nuisance, and a menace through being distributed from lofty stacks in the form of an impalpable caustic dust over the community.

I next take the combined calcium carbonate and calcium oxid as above provided and reduce it to a finely divided paste by grinding it in the presence of water, through a suitable type of mill, such as a tube mill, or pebble mill, or through mill stones; and during which the calcium oxid is changed into a calcium hydroxid, and later to a milk of lime. The calcium carbonate content of the mass having been rendered much softer and more friable, by its previous contact with the heat, now acquires through this grinding operation a plasticity and thorough distribution through, and mixing with the calcium hydroxid. This reduction can also be achieved by grinding the calcium oxid, and calcium carbonate mixture, without the addition of water, but the wet method is most desirable, as eliminating all caustic dust from the air of the grinding room.

Having reduced the combined calcium oxid and calcium carbonate to a finely divided and intimately mixed paste, in which the calcium oxid has been first changed to a calcium hydroxid, and then to a milk of lime, I next treat this paste with a solution of sodium carbonate of 10 degrees to 20 degrees Baumé by agitating the two for a period of one hour, more or less, at a temperature somewhat near the boiling point, and which has the chemical effect of changing the calcium hydroxid or milk of lime back into a calcium carbonate with the physical difference now being soft and chalky, instead of harsh and gritty as in its native state.

During the above operation, the sodium carbonate has been changed into sodium hydroxid, and this I now filter away from the precipitate by a suitable appliance, afterward evaporating into caustic soda crystals, or store for use in its liquid condition. The resulting precipitate I subject to several washings or agitations, each with fresh water, filtering off, or decanting off the excess each time in order to extract the soluble sodium hydroxid then remaining, or I use for the same purpose one or more rotary or other type of filter presses. After eliminating the soluble alkali, as above provided, I thoroughly dry the resulting calcium carbonate by passing it through a drier of the rotary type, or other type or in a suitable dry room provided for the purpose, after which the dry product is subjected to the action of an attrition, or other mill suitable for the object of pulverizing or grinding any lumps or substances remaining after the operation of drying is finished.

In the foregoing preferred manner of practising the invention, the material operated upon is limestone, but shells or other material high in calcium carbonate may be employed in lieu of the limestone. Moreover, it is within the scope of this invention to employ the waste from lime kilns, in which event the step of the process which consists in subjecting the calcium carbonate to a sudden high temperature may be dispensed with, if desired, as the waste from lime kilns has already been subjected to high temperature and embodies a combination of partially burnt calcium carbonate and calcium oxid. The waste of the kilns may be treated by starting with the step of grinding the material, either with or without water, and thereafter continuing the process as hereinbefore outlined.

It will be apparent from the foregoing description that the present invention not only relates to the manufacture of whiting, but, that, as a by product, caustic soda results. By practising the method of this invention, caustic soda may be produced much more economically than has heretofore been possible, through the utilizing of the waste, semiwaste, or unburnt lime, which is generaly thrown away or disposed of at kilns. I may take this semiburnt or underburnt lime which has heretofore been thrown away as useless, and so treat the same with sodium carbonate that caustic soda results as one of the by-products. This invention in this respect differs from the prior practices in that the lime or calcium carbonate employed for the formation of the caustic soda is only partially burnt, whereas, heretofore, fully burnt lime or calcium oxid has been employed in the making of caustic soda.

The utilizing of the partially unburnt calcium carbonate under the present invention contemplates various percentage composition but, for the purpose of example it may be stated that unburnt calcium carbonate embodying anywhere between 25 to 75 per cent. calcium carbonate and the remainder calcium oxid, may be employed.

Having thus fully described the invention, what I claim as new and desire to secure by Letters Patent is:

1. The herein described method which consists in suddenly subjecting calcium carbonate to an intense heat to effect a disruption of the same into minute particles, and subjecting the particles thus formed to heat for a sufficient time to effect a change of a portion of the mass from calcium carbonate to calcium oxid leaving the remainder of the mass in the form of calcium carbonate.

2. The herein described method which consists in suddenly subjecting calcium carbonate to an intense heat to effect a disruption of the same into minute particles, and subjecting the particles thus formed to heat for a sufficient time to effect a change of the exterior of the individual particles from calcium carbonate to calcium oxid leaving a minute core of calcium carbonate within the individual particles.

3. The herein described method which consists in crushing limestone into convenient sizes, thereafter suddenly subjecting the crushed stone to an intense heat to effect a disruption of the pieces into minute particles, subjecting the particles thus formed to heat for a sufficient time to effect a burning of a portion of the mass while leaving a portion of the mass unburned, whereby the resulting product contains calcium carbonate and calcium oxid.

4. The herein described method which consists in crushing limestone into convenient sizes, thereafter suddenly subjecting the crushed stone to an intense heat to effect a disruption of the pieces into minute particles, subjecting the particles thus formed to heat for a sufficient time to effect a change of the exterior of the individual particles from calcium carbonate to calcium oxid leaving a core of calcium carbonate within the individual particles.

5. The herein described method which consists in crushing limestone into relatively small sized pieces, thereafter suddenly subjecting the crushed stone to intense heat to effect a disruption of the pieces into minute particles and render said particles amorphous, continuing the application of the heat for a sufficient time to change the exterior of the individual particles from calcium carbonate into calcium oxid leaving a minute core of calcium carbonate within the individual particles.

6. The herein described method of treating a combination of calcium carbonate and calcium oxid which consists in grinding the same into finely divided form, in the presence of water to form milk of lime, then heating the milk of lime in the presence of sodium carbonate, while agitating the mixture to change the product into calcium carbonate and sodium hydroxid, and then removing the sodium hydroxid, drying the remainder of the product, and finally grinding the same.

7. The herein described method of treating a combination of calcium carbonate and calcium oxid which consists in grinding the same into finely divided form, thereafter treating the ground product with sodium carbonate solution, while agitating the mixture and heating the mixture at approximately the boiling point thereof, then removing the sodium hydroxid, drying the remainder of the product, and finally grinding the same.

8. The herein described method of treating a combination of calcium carbonate and calcium oxid which consists in grinding the same into finely divided form, thereafter treating the ground product with sodium carbonate solution, then removing the resulting sodium hydroxid, drying the remainder of the product, and finally grinding the same.

9. The herein described method which consists in suddenly subjecting calcium carbonate to an intense heat to effect a disruption of the same into minute particles, subjecting the particles thus formed to heat for a sufficient time to effect a change of a portion of the mass from calcium carbonate to calcium oxid, leaving the remainder of the mass in the form of calcium carbonate, thereafter grinding the particles into finely divided form, then treating the ground product with sodium carbonate solution, removing the resulting sodium hydroxid, drying the remainder of the product and grinding the same.

10. The herein described method which consists in suddenly subjecting calcium carbonate to an intense heat to effect a disruption of the same into minute particles, subjecting the particles thus formed to heat for a sufficient time to effect a change of a portion of the mass from calcium carbonate to calcium oxid, leaving the remainder of the mass in the form of calcium carbonate, thereafter grinding the particles into finely divided form in the presence of water to form milk of lime, then heating the milk of lime in the presence of sodium carbonate, while agitating the same, to change the product into calcium carbonate and sodium hydroxid, then removing the sodium hydroxid, drying the remainder of the product, and finally grinding the same.

11. The herein described method which consists in crushing limestone into relatively small sized pieces, thereafter suddenly subjecting the crushed stone to intense heat to effect a disruption of the pieces into minute particles and render said particles amorphous, continuing the application of the heat for a sufficient time to change the exterior of the individual particles from calcium carbonate into calcium oxid, leaving a minute core of calcium carbonate within the individual particles, thereafter grinding the particles into finely divided form in the presence of sodium carbonate solution, while agitating the mixture to change the product into calcium carbonate and sodium hydroxid, and then removing the sodium hydroxid, drying the remainder of the product, and finally grinding the same.

12. The herein described method which consists in subjecting the mass consisting of between 25 to 75 per cent. calcium carbonate and the remainder calcium oxid to treatment with sodium carbonate solution, removing the resulting sodium hydroxid and finally dehydrating the hydroxid to form caustic soda crystals.

13. The method which consists in subjecting partially burnt limestone to treatment with sodium carbonate solution, thereafter removing the resulting sodium hydroxid, and dehydrating the hydroxid to form caustic soda crystals.

In testimony whereof, I have signed my name to this specification.

WILLIAM H. ALTON